March 13, 1951  B. M. BUTLER  2,545,224
BANDAGE SUPPORTING BELT
Filed April 28, 1949
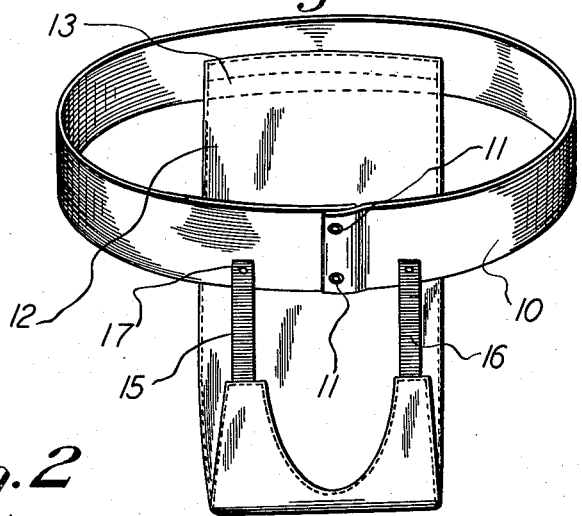
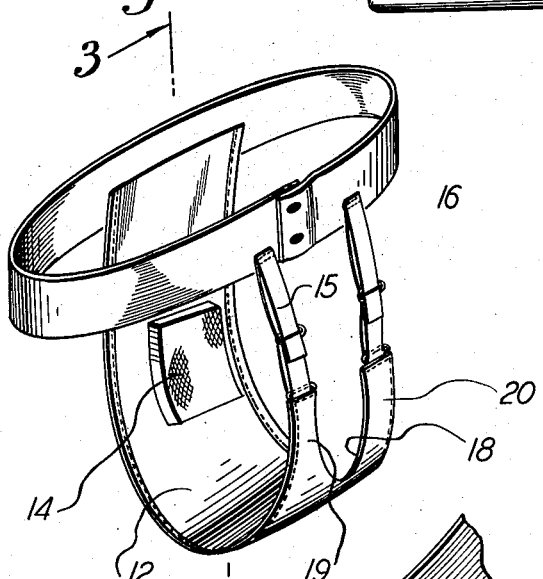
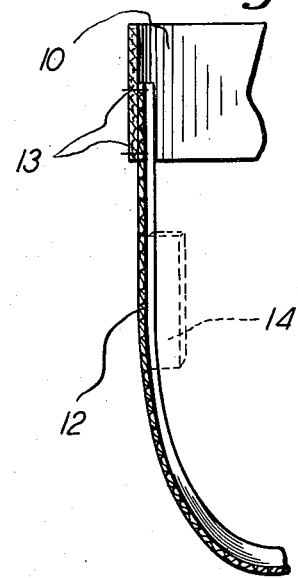
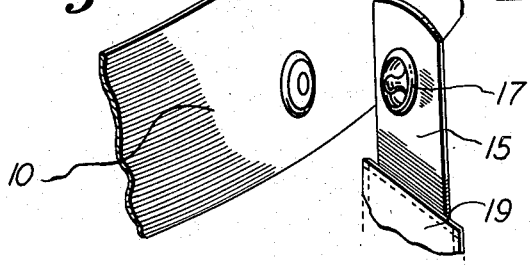
INVENTOR.
BERNICE M. BUTLER.
BY
Laforest S. Saulsbury
Attorney.

Patented Mar. 13, 1951

2,545,224

UNITED STATES PATENT OFFICE 2,545,224

BANDAGE SUPPORTING BELT

Bernice M. Butler, Brooklyn, N. Y.

Application April 28, 1949, Serial No. 90,175

1 Claim. (Cl. 128—167)

This invention relates to a body support.

It is an object of the present invention to provide a body support including a bandage supporting belt which can be fastened about the waist of the patient and which has a depending portion adapted to be passed under the legs and be secured to the opposite side of the belt and in such a manner that a bandage can be made secure under the body and for patients having had a hemorrhoids operation or where there is intense bleeding from under the body.

Other objects of the present invention are to provide a body support which is of simple construction, made of washable material, inexpensive to manufacture, easy to adjust upon the wearer, light in weight, and efficient in operation.

For other objects and for a better understanding of the invention, reference may be had to the following detailed description taken in connection with the accompanying drawing, in which:

Fig. 1 is an elevational view of a body support embodying the features of the present invention.

Fig. 2 is a perspective view of the body support looking into the interior of the bandage supporting portion.

Fig. 3 is a vertical sectional view taken generally on line 3—3 of Fig. 2.

Fig. 4 is a fragmentary view of the belt part and of one of the straps and illustrating the manner in which the fastening elements are secured together by snap fastening elements.

Referring now to the figures, 10 represents a belt or band portion which is made of washable material, such as elastic, and which is adapted to be joined at its ends by snap fastening elements 11. This belt or band is made sufficiently wide to be comfortable about the body of the wearer and is of such length as to tightly fit the wearer.

Secured by stitching to the interior of the belt or band portion is a bandage supporting portion or apron 12. The stitching is indicated at 13. This supporting portion is sufficiently wide to adequately carry a gauze bandage element 14. The portion 12 may be extended under the legs of the wearer and has, at its releasable end, securing and adjustable straps 15 and 16 which are secured by snap fastening elements 17 to the front of the belt portion in the manner more clearly illustrated in Fig. 4. These fastening elements are the usual snap fastener members of grommet-like construction and secured to the parts to be connected together. The free end of the bandage supporting portion is bifurcated, as indicated at 18, to provide two tongues or furcations 19 and 20 to which the adjustable straps 15 and 16 are respectively connected.

With the belt tightly secured about the wearer and the bandage compress 14 in place upon the bandage supporting portion, the compress 14 will be tightly held and pressed against the body. Since the belt is made of washable material, there is no need for further protection to the belt than that afforded by the compress 14. The compress 14 can be either stitched or connected to the supporting portion by an adhesive in order to positively prevent any falling of the same. If the bandage supporting portion is made sufficiently secure, the fixing of the bandage compress 14 to the portion 12 is unnecessary. The belt can be worn a number of times without having to be cleaned and the bandage compress or pad can be easily replaced without difficulty. This pad can be replaced while keeping the belt tight upon the body and simply sliding the pad beneath the bandage supporting portion, or by simply releasing one of the straps 15 and 16 to allow one side of the portion 12 to be free. By having the straps 15 and 16 made of stretchable material, any slack in the portion 12 will be automatically taken up to provide a tight grip upon the compress or pad.

While various changes may be made in the detail construction, it shall be understood that such changes shall be within the spirit and scope of the present invention as defined by the appended claim.

What is claimed is:

A body support comprising an elastic belt adapted to fit tightly about the body of a wearer, said belt being separable in front, a wide flexible apron permanently secured at its rear end to the back of the belt and separably secured at its front end to the front of the belt whereby the apron is adapted to be positioned between the legs of the wearer, the front portion of the apron being bifurcated and comprising an adjustable elastic strap in each furcation, the rear portion of the apron being substantially wider than the extent of the adjustable straps and the space therebetween and being secured throughout its full width to the belt and a bandage positioned on the apron whereby it will be pressed against a portion of the body.

BERNICE M. BUTLER.

REFERENCES CITED

The following references are of record in the file of this patent:

UNITED STATES PATENTS

| Number | Name | Date |
|---|---|---|
| 937,724 | Small | Oct. 19, 1909 |

FOREIGN PATENTS

| Number | Country | Date |
|---|---|---|
| 291,995 | Italy | Dec. 31, 1931 |